US006403761B2

United States Patent
Takami et al.

(12)

(10) Patent No.: US 6,403,761 B2
(45) Date of Patent: Jun. 11, 2002

(54) METHOD FOR RECOVERING A POLYMER

(75) Inventors: Nobuyasu Takami; Kazumi Uchimura; Kunio Yoshioka; Kazuyoshi Nakazawa, all of Tokyo (JP)

(73) Assignee: JSR Corporation, Tokyo (JP)

( * ) Notice: Subject to any disclaimer, the term of this patent is extended or adjusted under 35 U.S.C. 154(b) by 0 days.

(21) Appl. No.: 09/885,114

(22) Filed: Jun. 21, 2001

(30) Foreign Application Priority Data

Jun. 22, 2000 (JP) ......................................... 2000-188136

(51) Int. Cl.$^7$ .................................................. C08F 6/00
(52) U.S. Cl. ....................................................... 528/480
(58) Field of Search ................................ 528/480, 196, 528/198; 525/55

(56) References Cited

FOREIGN PATENT DOCUMENTS

| JP | 54-12949 | 1/1979 |
| JP | 57-47685 | 10/1982 |
| JP | 59-91101 | 5/1984 |
| JP | 60-29721 | 2/1985 |
| JP | 61-52163 | 11/1986 |
| JP | 63-442 | 1/1988 |

*Primary Examiner*—Terressa M. Boykin
(74) *Attorney, Agent, or Firm*—Oblon, Spivak, McClelland, Maier & Neustadt, P.C.

(57) ABSTRACT

A method for recovering a polymer efficiently from a polymer solution obtained by a solution polymerization is provided. By means of a method for recovering a polymer comprising heating a polymer solution obtained by a solution polymerization indirectly in a pipe to evaporate a solvent while forming a gas-liquid mixed phase flow or a gas-liquid-solid mixed phase flow followed by supplying the mixture to a recovery tank under pressure or under reduced pressure to separate the polymer from the solvent, the polymer can efficiently be separated from the solvent without changing the physical characteristics or the chemical characteristics of the polymer. When recovering a polymer from a polymer solution having a high viscosity, an infusion of water or steam serves to reduce the viscosity of the polymer solution and also to increase the linear velocity of a gas, whereby preventing the occlusion of a pipe and facilitating the operation.

18 Claims, 3 Drawing Sheets

METHOD FOR RECOVERING A POLYMER

BACKFGROUND OF THE INVENTION

1. Field of the Invention

The present invention relates to a method for recovering a polymer, more particularly, a method for recovering a polymer efficiently from a polymer solution obtained by a solution polymerization.

2. Description of the Related Art

Generally in order to recover a polymer from a polymer solution obtained by a solution polymerization, the polymer solution after polymerization is washed with water or the like to decompose and remove the residual catalyst and then devolatilized to remove the volatiles such as a polymerization solvent, an unreacted monomer or a small amount of water or the like from the polymer solution, whereby recovering the polymer. In a conventional devolatilization process, a polymer solution is concentrated previously for example by a flash evaporation or the like and then a steam stripping is performed.

However, the method described above poses a steam consumption as problematically large as 70 parts or more by mass per 100 parts by mass of a solvent in spite of an attempt to multiple utilization of the steam generally using several strippers. Accordingly, a devolatilization method employing no steam stripping, including a method using a devolatilizing extruder such as a twin-screw extruder and the like or using a thin film evaporator has been investigated.

While the steam consumption is reduced substantially by using a devolatilizing extruder or a thin film evaporator for a devolatilization, the application to a polymerization solution of an elastomer such as a butadiene rubber or a styrene-butadiene rubber or the like was revealed to pose an additional problem which is described below. Thus, since such elastomer characteristically causes, unlike to an ordinary thermoplastic resin, a rapid increase in the solution viscosity at a higher concentration which is not reduced correspondingly even when the temperature is elevated, a higher concentration established at a later stage of a devolatilization process results in a rapid increase in the power required to be exerted by a devolatilization machine such as an extruder or the like, which leads to a problematically reduced devolatilizing efficiency.

Accordingly, in an attempt to solve this problem, a twin-screw extruder provided with a vent (for example in Japanese Patent Publication No. 47685/1982, Japanese Laid-Open No. 12949/1979) or a devolatilization performed using a devolatilization aid such as water or the like (for example in Japanese Patent Publication No. 442/1988, Japanese Laid-Open No. 91101/1984, Japanese Patent Publication No. 29721/1985, Japanese Patent Publication No. 52163/1986) was proposed. Nevertheless, such attempt resulted in no sufficient devolatilization efficiency.

SUMMARY OF THE INVENTION

The present invention overcomes the problems experienced conventionally as described above, and is intended to provide a method for recovering a polymer with sufficient devolatilizing efficiency.

The present invention is based on the findings described above and can be described as follows.

1. A method for recovering a polymer comprising heating a polymer solution obtained by a solution polymerization indirectly in a pipe to evaporate a solvent while forming a gas-liquid mixed phase flow or a gas-liquid-solid mixed phase flow followed by supplying the gas-liquid mixed phase flow or the gas-liquid-solid mixed phase flow into a recovery tank to recover the polymer.
2. A method for recovering a polymer according to 1 above, wherein water or steam is infused into the polymer solution in the pipe.
3. A method for recovering a polymer according to 2 above, wherein the amount of the water infused is 0.001 to 20 parts by mass based on 100 parts by mass as the solvent in the polymer solution.
4. A method for recovering a polymer according to 3 above, wherein the number-average molecular weight of the polymer in the polymer solution is 5,000 to 1,000,000.
5. A method for recovering a polymer according to 4 above, wherein the viscosity of the polymer solution is 0.001 to 300 Pa·s.
6. A method for recovering a polymer according to 5 above, wherein the concentration of the polymer in the polymer solution is 0.1 to 80% by mass.
7. A method for recovering a polymer according to 6 above, wherein the polymer is at least one selected from the group consisting of butadiene rubber, styrene-butadiene rubber, isoprene rubber, ethylene-propyrene rubber, butyl rubber, styrene-butadiene copolymer, styrene-isoprene copolymer, butadiene block polymer, butadiene resin and acryl resin.
8. A method for recovering a polymer according to 7 above, wherein the linear velocity of a gas at the outlet of the pipe is 10 m/s or more.
9. A method for recovering a polymer according to 8 above, wherein the devolatilizing efficiency is 0.6 or less.
10. A method for recovering a polymer according to 2 above, wherein the amount of the steam infused is 0.001 to 30 parts by mass based on 100 parts by mass as the solvent in the polymer solution.
11. A method for recovering a polymer according to 10 above, wherein the number-average molecular weight of the polymer in the polymer solution is 5,000 to 1,000,000.
12. A method for recovering a polymer according to 11 above, wherein the viscosity of the polymer solution is 0.001 to 300 Pa·s.
13. A method for recovering a polymer according to 12 above, wherein the concentration of the polymer in the polymer solution is 0.1 to 80% by mass.
14. A method for recovering a polymer according to 13 above, wherein the polymer is at least one selected from the group consisting of butadiene rubber, styrene-butadiene rubber, isoprene rubber, ethylene-propyrene rubber, butyl rubber, styrene-butadiene copolymer, styrene-isoprene copolymer, butadiene block polymer, butadiene resin and acryl resin.
15. A method for recovering a polymer according to 14 above, wherein the linear velocity of a gas at the outlet of the pipe is 10 m/s or more.
16. A method for recovering a polymer according to 15 above, wherein the devolatilizing efficiency is 0.6 or less.
17. A method for recovering a polymer according to 1 above, wherein further removing a residual solvent by supplying the polymer in the recovery tank to a devolatilizing extruder and molding of the desolvated polymer.
18. A method for recovering a polymer according to 17 above, wherein water or steam is infused into the polymer solution in the pipe.

According to the invention, the polymer can efficiently be recovered without changing the physical characteristics or the chemical characteristics of the polymer. Especially when recovering a polymer from a polymer solution having a high viscosity, an infusion of water or steam serves to reduce the viscosity of the polymer solution and also to increase the flow rate in the pipe, whereby ensuring the prevention of the occlusion of a pipe and facilitating the operation. In addition, a substantial reduction in the steam consumption allows the operation to be accomplished at a lower cost.

DETAILED DESCRIPTION OF THE INVENTION

A method for recovering a polymer of the invention comprises heating a polymer solution obtained by a solution polymerization indirectly in a pipe to evaporate a solvent while forming a gas-liquid mixed phase flow or a gas-liquid-solid mixed phase flow followed by supplying the mixture to a recovery tank to recover the polymer.

Water or steam also may be infused into a polymer solution in a pipe.

A polymer to which a method of the invention is applied may not be limited particularly as long as it is a polymer capable of being synthesized by a known solution polymerization. With regard to the preferable physical parameters of a polymer which can efficiently be recovered, the number-average molecular weight Mn is preferably 5,000 to 1,000,000, more preferably 20,000 to 800,000 and most preferably 50,000 to 500,000, and the viscosity of the polymer solution supplied is preferably 0.001 to 300 Pa·s, more preferably 0.005 to 200 Pa·s and most preferably 0.01 to 100 Pa·s. As a polymer there may be mentioned butadiene rubber, styrene-butadiene rubber, isoprene rubber, ethylene-propylene rubber, butyl rubber, styrene-butadiene copolymer, styrene-isoprene copolymer, butadiene block polymer, butadiene resin, acrylic resin and the like. For an efficient operation without any occlusion of the pipe, the concentration of a polymer supplied is preferably 0.1 to 80% by mass, more preferably 1 to 50% by mass, most preferably 5 to 30% by mass.

Solvent used in the invention is not particularly restricted but may be toluene, xylene, n-hexane, cyclohexane, n-pentane, cyclopentane, iso pentane, n-heptane, cycloheptane, noctane, cyclooctane, n-decane, benzene dichloromethane and the like which is used in solution polymerization.

DESCRIPTION OF THE PREFERRED EMBODIMENTS

Figure 1:
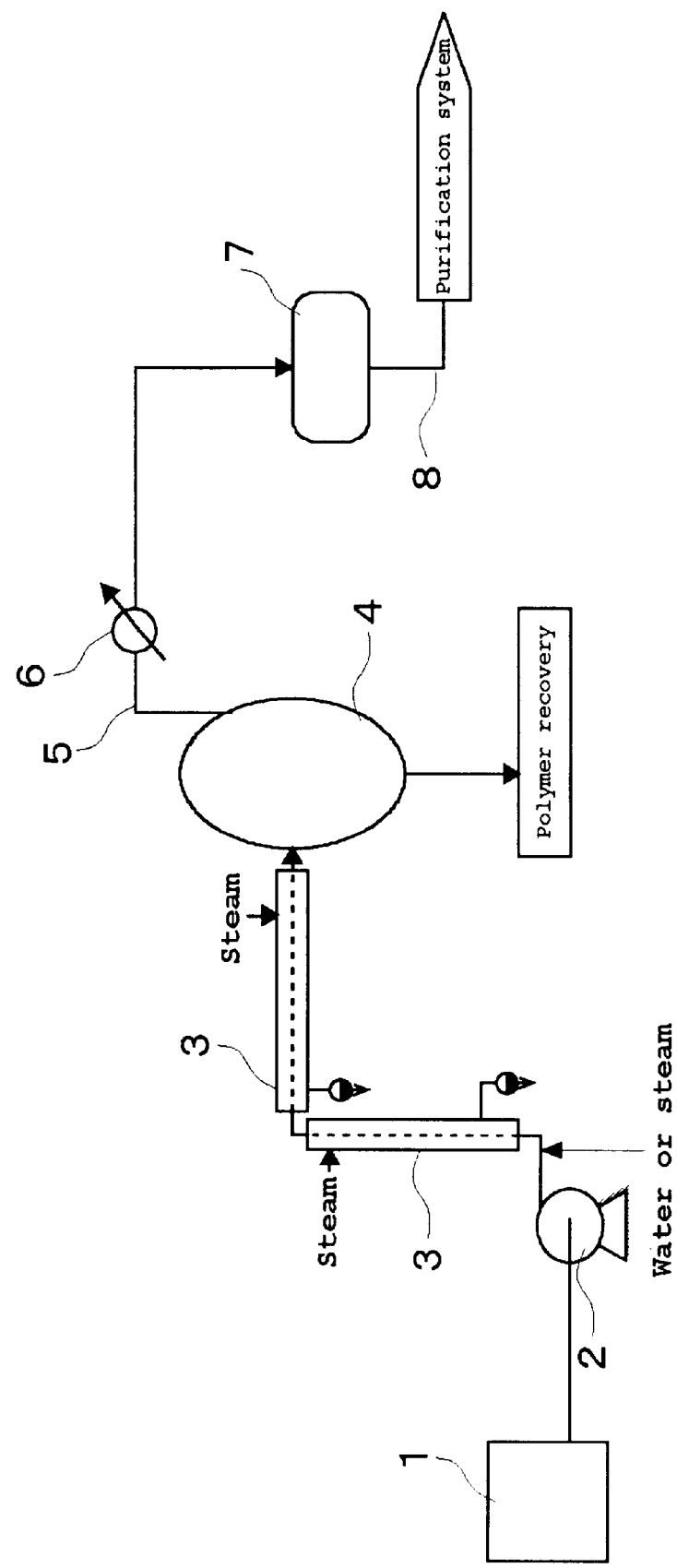
FIG. 1 is a schematic view of a system employed in Example 1.

An example of the recovery method of the invention is discussed with referring to FIG. 1. The system having the structure shown in FIG. 1 consists of intermediate tank or polymerization tank 1, volumetric pump 2, long tubular heater 3, recovery tank 4, first conduit 5, condenser 6, solvent tank 7 and second conduit 8.

The long tubular heater described above is that jacket is equipped with a cylindrical pipe and that can heat-exchange with the fluid in the pipe by flowing a heat medieum such as a steam and the like. The long tubular heater can be used a double-pipe and that a long pipe is turned again and again in one shell.

A polymer solution obtained by a solution polymerization is pressurized by the volumetric pump 2 to be supplied from the intermediate tank or the polymerization tank to the long tubular heater 3. The long tubular heater 3 employs a heat exchange system consisting of a cylindrical pipe fitted with a jacket which is heated by a heating medium such as steam or the like, and the polymer solution entering the long tubular heater 3 receives the heat from the jacket and is heated to the boiling point of the solvent. When the boiling of the solution is initiated, the solvent is evaporated to increase the flow rate in the pipe, resulting in a turbulent flow in the pipe, which allows the heat to be transmitted at a high thermoconductivity, whereby evaporating the solvent. In this manner, a gradual boiling increases the flow rate, which drives the polymer to enter the recovery tank 4 without plugging in the pipe. Desolvated polymer which precipitates on the bottom of the recovery tank 4 is recovered here as a strand, granulated or powder-like crumb. From the top of the recovery tank 4, the evaporated solvent vapor comes out and passes through the first conduit 5 to enter the condenser 6, where it is cooled and liquefied, stored in the solvent tank 7, enters a purification system through the second conduit 8, and then is recovered after a purification.

A linear velocity of the effluent gas from the long tubular heater is controlled by inner diameter of the pipe, temperature, polymer concentration, pressure of the recovery tank or the like, and is generally 10 m/s or more, preferably 20 m/s or more, more preferably 100 m/s or more, most preferably 200 m/s or more. Upper limit is generally 800 m/s. The faster linear velocity of the effluent gas results in prevention from a polymer degradation or the like during thermal treatment and an improvement in use of a steam when compared with a conventional steam stripping method. The linear velocity of the effluent gas of 10 m/s or less leads to a problematically reduced effect of occlusion in a pipe.

The linear velocity of the effluent gas under reduced pressure is preferably 100 to 200 m/s in condensation of the polymer solution, preferably 300 to 400 m/s in drying of the polymer. And the linear velocity of the effluent gas under pressure is preferably 20 to 100 m/s.

Figure 2:
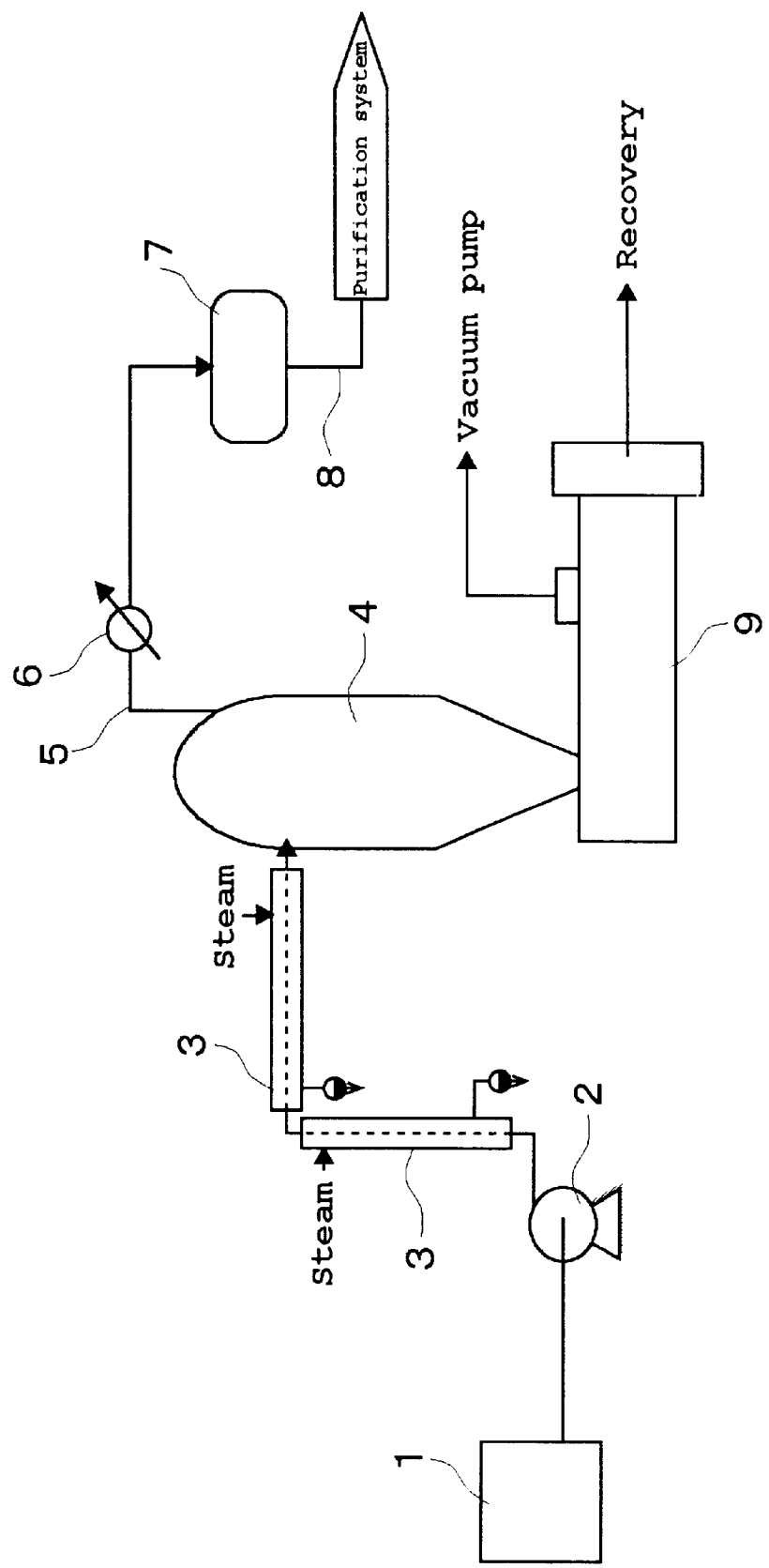
FIG. 2 is a schematic view of another system according to the invention.

In addition, a devolatilizing extruder can be combined in the invention as shown in FIG. 2. The crumb in the recovery tank 4 is supplied directly to the devolatilizing extruder 9, and the residual solvent is devolatilized and released from the vent, after that the desolved polymer is molded.

In the invention, it is essential that a sample solution is pumped volumetrically into the long tubular heater 3 without occluding the pipe, and the volumetric pump 2 employed may for example be a gear pump, a diaphragm pump and a plunger pump, and the like.

The inner diameter of the long tubular heater 3 is preferably 5 to 100 mm, more preferably 6 to 80 mm, and most preferably 8 to 50 mm. An inner diameter smaller than 5 mm leads to a problematically larger pressure loss in the heater. An inner diameter larger than 100 mm leads to less heat transmission to a polymer solution into the innermost center of the pipe, resulting in a problematically ineffective devolatilization.

The length of the long tubular heater 3 may vary to give a required calories, depending on the calorie exerted upon evaporation of the solvent of a polymer solution as well as the calorie given upon heating in the jacket and may for example be 5 to 200 m. The shape of the long tubular heater 3 may be linear, curved and spiral in order not to ensure the prevention of the occlusion of a pipe.

While the recovery tank 4 may be under pressure or under reduced pressure, it is preferably under reduced pressure. Under reduced pressure the large volume due to vaporization of the solvent makes a linear velocity of the effluent gas faster and the occlusion prevention with polymer deposited in a pipe. On the other hand, under pressure it is easy to operate a continuous outlet and handle it.

In order to ensure the occlusion prevention of a pipe, water or steam can be infused into a polymer solution into a pipe. By infusing water, the viscosity of the polymer solution can be reduced, and, in addition, the flow rate in the pipe can easily be increased as a result of the increase in the volume upon vaporization which is attributable to the small molecular weight of water. Furthermore, the foaming performance of a polymer recovered can be improved and the devolatilization performance can be improved. While a non-condensable compressed gas such as nitrogen or the like-instead of water or steam may also be infused, the presence of a non-condensable gas is disadvantageous in the subsequent condensation recovery of the solvent vapor. More preferably, a substance having a lower molecular weight is employed since a substance having a large molecular weight does not give a sufficiently increased evaporation volume even if it is a condensable substance. Therefore, one infused preferably is water or steam. While the site where the infusion is effected is not particularly limited, it is preferably the inlet of the long tubular heater for the purpose of reducing the viscosity of a polymer solution as soon as possible.

When water is infused, an infusion of a large amount is disadvantageous thermally due to a large evaporation latent heat. The amount of water to be infused is preferably 0.001 to 20 parts by mass per 100 parts by mass of the solvent in a polymer solution, more preferably, 0.005 to 15 parts by mass, and most preferably 0.01 to 10 parts by mass. And when steam is infused, the amount of steam to be infused is preferably 0.001 to 30 parts by mass per 100 parts by mass of the solvent in a polymer solution, more preferably, 0.01 to 20 parts by mass, and most preferably 0.1 to 15 parts by mass. When steam is infused, it is infused preferably as a wet vapor in order to prevent a thermal degradation of a polymer.

Figure 3:
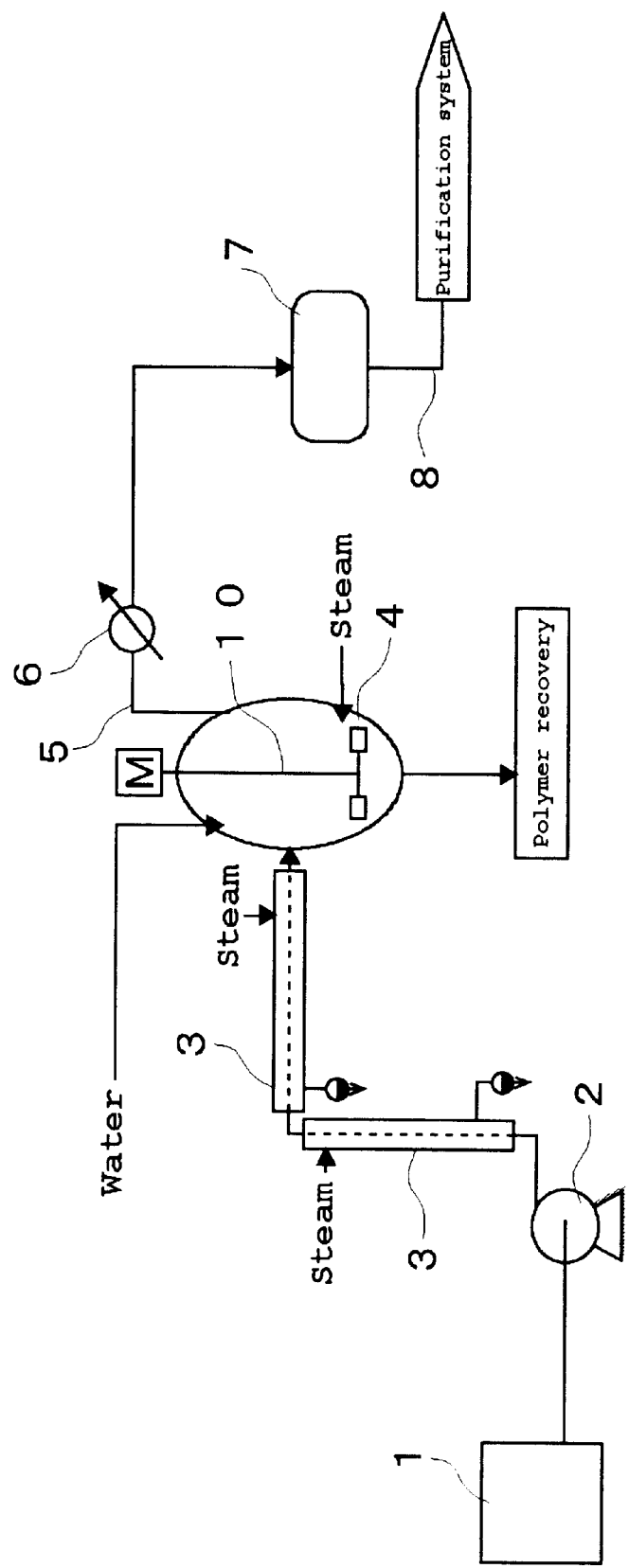
FIG. 3 is a schematic view of still another system according to the invention.

In the invention, a conventional steam stripping method can be combined with the method of the invention. A polymer solution heated in a pipe is in a highly foaming condition, and a combinatory use of a steam stripping results in a substantial improvement in the solvent recovery per unit steam when compared with a conventional steam stripping method alone. In the structure of the system shown in FIG. 3, water is poured onto a polymer recovered in the recovery tank 4 to form a water slurry, whereby facilitating the handling for transporting to the subsequent step. Depending on the type of the polymer, the recovery tank 4 is fitted further with the stirrer 10 and may also feed a steam.

When a large amount of a polymer solution is to be processed, a multi-pipe system can be employed. In such a case, a sample solution should be pumped into all pipes uniformly, since it congests in the pipes with undergoing a thermal degradation together with a possibility of occluding the pipes unless a uniform pumping to the all pipes is accomplished.

In the invention, the devolatilizing efficiency, that is the amount of steam consumption per the amount of solvent, is preferably 0.6 or less, more preferably 0.5 or less, and most preferably 0.4 or less.

Description of the Preferred Embodiments

EXAMPLE 1

As a sample a 20% by mass solution of a styrene-butadiene block copolymer whose styrene content was 10% by mass [number-average molecular weight (Mn); 300,000, melt flow rate (MFR); 3.0 g/10 minutes (determined at 230° C., loaded with 2.16 kg)] and whose viscosity was 2.0 Pa·s at 60° C., polymerized using cyclohexane as a reaction solvent, n-butyllithium as a polymerization initiator, an experiment was conducted in a system having the structure shown in FIG. 1. The abovementioned number-average molecular weight was determined by gel permeation chromatography, and the viscosity was determined by Brook-field type viscometer.

A long tubular heater was of a heat exchange system consisting of a pipe (made of SUS 304) whose inner diameter and length were 8 mm and 10 m, respectively, (thermoconductive area of 0.25 $m^2$) fitted with a jacket, and a steam was introduced to the jacket to effect a heating so that the jacket was kept at 150° C. Then the sample solution was supplied by a plunger pump at 60° C., 10 kg/hour. When a vacuum pump was used to reduce the pressure of the recovery tank to 50 mmHg a white granulated crumb could be recovered continuously into the recovery tank. During this operation, the tubular heater was not occluded at all. The linear velocity of the gas at the outlet of the pipe was 250 m/s.

The residual solvent was little and the lebel was 500 ppm. The steam consumption was 30 parts by mass per 100 parts by mass of the solvent (the devolatilizing efficiency was 0.3), which was close to 20% by mass which is a required calorie (theoretical value) in an indirect heating, showing a substantial reduction in the steam consumption compared with a conventional steam stripping method.

EXAMPLE 2

An experiment was performed similarly to Example 1 except for using as a sample a 20% by mass solution of a butadiene rubber [number-average molecular weight (Mn); 200,000, Mooney viscosity $ML_{1+4}$(100° C.); 35] whose viscosity was 8 Pa·s at 60° C., polymerized using toluene as a reaction solvent and triethylaluminum as a polymerization initiator, adding 5.0 parts by mass of water via the inlet of the pipe. The Mooney viscosity was measured in accordance with JIS K6300.

The linear velocity of the gas at the outlet of the pipe was 290 m/s. During this operation, the tubular heater was not occluded at all and a string-like crumb could be recovered continuously into the recovery tank. The residual solvent was little and was 2000 ppm. The steam consumption was 30 parts by mass per 100 parts by mass of the solvent (the devolatilizing efficiency was 0.3), which was close to 20% by mass which is a required calorie (theoretical value) in an indirect heating, showing a substantial reduction in the steam consumption compared with a conventional steam stripping method.

EXAMPLE 3

An experiment was performed similarly to Example 1 except for using as a sample a 20 % by mass solution of a styrene-butadiene copolymer whose styrene content was 20% by mass [number-average molecular weight (Mn); 380,000, Mooney viscosity $ML_{1+4}$(100° C.); 70] and whose viscosity was 5 Pa·s at 60° C., polymerized using cyclohexane as a reaction solvent and adding 10 parts by mass of steam via the inlet of the pipe.

The linear velocity of the gas at the outlet of the pipe was 340 m/s. During this operation, the tubular heater was not occluded at all and a granulated crumb could be recovered continuously into the recovery tank. The residual solvent was little and was 500 ppm. The steam consumption was 30 parts by mass per 100 parts by mass of the solvent (the devolatilizing efficiency was 0.3), which was close to 20% by mass which is a required calorie (theoretical value) in an indirect heating, showing a substantial reduction in the steam consumption compared with a conventional steam stripping method.

EXAMPLE 4

An experiment was performed similarly to Example 1 except for using as a sample a 20% by mass solution of a styrene-butadiene copolymer whose styrene content was 48% by mass [number-average molecular weight (Mn); 50,000, MFR; 3.0 g/10 minutes (determined at 230° C., loaded with 2.16 kg)] and whose viscosity was 0.5 Pa·s at 60° C., polymerized using toluene as a reaction solvent and adding 2 parts by mass of steam via the inlet of the pipe.

The linear velocity of the gas at the outlet of the pipe was 250 m/s. During this operation, the tubular heater was not occluded at all and a granulated crumb could be recovered continuously into the recovery tank. The residual solvent was little and was 300 ppm. The steam consumption was 30 parts by mass per 100 parts by mass of the solvent (the devolatilizing efficiency was 0.3), which was close to 20% by mass which is a required calorie (theoretical value) in an indirect heating, showing a substantial reduction in the steam consumption compared with a conventional steam stripping method.

As result from examples described above, a crumb having a reduced residual solvent was obtained without occluding the heating vessel. In addition, the steam consumption was reduced substantially, enabling an efficient polymer recovery.

What is claimed is:

1. A method for recovering a polymer comprising heating a polymer solution produced by a solution polymerization indirectly in a pipe to evaporate a solvent while forming a gas-liquid mixed phase flow or a gas-liquid-solid mixed phase flow followed by supplying said gas-liquid mixed phase flow or said gas-liquid-solid mixed phase flow into a recovery tank to recover said polymer.

2. A method for recovering a polymer according to claim 1, wherein water or steam is infused into said polymer solution in said pipe.

3. A method for recovering a polymer according to claim 2, wherein the amount of said water infused is 0.001 to 20 parts by mass based on 100 parts by mass as said solvent in said polymer solution.

4. A method for recovering a polymer according to claim 3, wherein the number-average molecular weight of said polymer in said polymer solution is 5,000 to 1,000,000.

5. A method for recovering a polymer according to claim 4, wherein the viscosity of said polymer solution is 0.001 to 300 Pa·s as measured at 60° C. in a 20% by mass polymer solution in cyclohexane or toluene.

6. A method for recovering a polymer according to claim 5, wherein the concentration of said polymer in said polymer solution is 0.1 to 80% by mass.

7. A method for recovering a polymer according to claim 6, wherein said polymer is at least one selected from the group consisting of butadiene rubber, styrene-butadiene rubber, isoprene rubber, ethylene-propyrene rubber, butyl rubber, styrene-butadiene copolymer, styrene-isoprene copolymer, butadiene block polymer, butadiene resin and acryl resin.

8. A method for recovering a polymer according to claim 7, wherein the linear velocity of a gas at the outlet of said pipe is 10 m/s or more.

9. A method for recovering a polymer according to claim 8, wherein the devolatilizing efficiency is 0.6 or less.

10. A method for recovering a polymer according to claim 2, wherein the amount of said steam infused is 0.001 to 30 parts by mass based on 100 parts by mass as said solvent in said polymer solution.

11. A method for recovering a polymer according to claim 10, wherein the number-average molecular weight of said polymer in said polymer solution is 5,000 to 1,000,000.

12. A method for recovering a polymer according to claim 11, wherein the viscosity of said polymer solution is 0.001 to 300 Pa·s as measured at 60° C. in a 20% by mass polymer solution in cyclohexane or toluene.

13. A method for recovering a polymer according to claim 12, wherein the concentration of said polymer in said polymer solution is 0.1 to 80% by mass.

14. A method for recovering a polymer according to claim 13, wherein said polymer is at least one selected from the group consisting of butadiene rubber, styrene-butadiene rubber, isoprene rubber, ethylene-propyrene rubber, butyl rubber, styrene-butadiene copolymer, styrene-isoprene copolymer, butadiene block polymer, butadiene resin and acryl resin.

15. A method for recovering a polymer according to claim 14, wherein the linear velocity of a gas at the outlet of said pipe is 10 m/s or more.

16. A method for recovering a polymer according to claim 15, wherein the devolatilizing efficiency is 0.6 or less.

17. A method for recovering a polymer according to claim 1, wherein further removing a residual solvent by supplying said polymer in said recovery tank to a devolatilizing extruder and molding of the desolvated polymer.

18. A method for recovering a polymer according to claim 17, wherein water or steam is infused into said polymer solution in pipe.

* * * * *